(12) United States Patent
Inui et al.

(10) Patent No.: US 10,962,704 B2
(45) Date of Patent: Mar. 30, 2021

(54) DISPLAY DEVICE

(71) Applicant: SHARP KABUSHIKI KAISHA, Sakai (JP)

(72) Inventors: Yohji Inui, Sakai (JP); Hiromi Enomoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/615,127

(22) PCT Filed: May 23, 2018

(86) PCT No.: PCT/JP2018/019777
§ 371 (c)(1),
(2) Date: Nov. 19, 2019

(87) PCT Pub. No.: WO2018/221335
PCT Pub. Date: Dec. 6, 2018

(65) Prior Publication Data
US 2020/0124785 A1 Apr. 23, 2020

(30) Foreign Application Priority Data
May 30, 2017 (JP) .............................. JP2017-106130

(51) Int. Cl.
*F21V 8/00* (2006.01)
*G02F 1/1333* (2006.01)
*G02F 1/1339* (2006.01)

(52) U.S. Cl.
CPC ......... *G02B 6/0068* (2013.01); *G02B 6/0091* (2013.01); *G02F 1/1339* (2013.01); *G02F 1/133345* (2013.01); *G02F 1/13396* (2021.01)

(58) Field of Classification Search
CPC ................ G02B 6/0068; G02B 6/0091; G02F 1/133345; G02F 1/1339; G02F 2001/13396
See application file for complete search history.

(56) References Cited

U.S. PATENT DOCUMENTS

| | | | |
|---|---|---|---|
| 2005/0206812 A1 | 9/2005 | Tsubata | |
| 2010/0165271 A1* | 7/2010 | Tsubata | ............... G02F 1/13394 349/106 |
| 2015/0241621 A1* | 8/2015 | Inui | ...................... G02B 6/0051 349/65 |

FOREIGN PATENT DOCUMENTS

| | | |
|---|---|---|
| JP | 2002-341336 A | 11/2002 |
| JP | 2005-266011 A | 9/2005 |
| WO | 2014/050729 A1 | 4/2014 |

* cited by examiner

*Primary Examiner* — Nathanael R Briggs
(74) *Attorney, Agent, or Firm* — ScienBiziP, P.C.

(57) ABSTRACT

A display device includes: a light source; a light guide plate having a light input end face that is at least a portion of an outer peripheral end surface and a light-exit surface that is one of two plate surfaces of the light guide plate and through which the light exits the light guide plate; a display panel including two substrates sandwiching a liquid crystal layer therebetween and configured to display an image by using light from the light-exit surface; a first display section included in the display panel and located relatively away from the light source and in which the liquid crystal layer has a relatively large thickness; and a second display section included in the display panel and located relatively near the light source and in which at least a portion of the liquid crystal layer has a relatively small thickness.

10 Claims, 11 Drawing Sheets

DISPLAY DEVICE

TECHNICAL FIELD

The present invention relates to a display device.

BACKGROUND ART

A known example of a liquid crystal display device is described in Patent Document 1 listed below. In the liquid crystal display device in Patent Document 1, brightness unevenness at the backlight device is determined and then the thickness of the color filter is adjusted for each of the pixels such that the brightness unevenness caused by the backlight device is reduced and the brightness unevenness over the entire display area is mitigated.

RELATED ART DOCUMENT

Patent Document

Patent Document 1: Japanese Unexamined Patent Application Publication No. 2002-341336

Problem to be Solved by the Invention

In the liquid crystal display device described in Patent Document 1, the color filters have different thicknesses at different positions in the display surface. Thus, the colors may have different tints depending on the positions in the display surface, possibly causing visible color unevenness. Patent document 1 also discloses a configuration including a light transmission control layer that is constituted by a gray dye containing R, G, and B dyes in an equal amount. However, the additional light transmission control layer increases the production cost.

DISCLOSURE OF THE PRESENT INVENTION

The present invention was made in view of the above-described circumstances and an object thereof is to reduce color unevenness and cost.

Means for Solving the Problem

A display device according to the present invention includes a light source, a light guide plate having a light input end face that is at least a portion of an outer peripheral end surface and through which light from the light source enters the light guide plate and a light-exit surface that is one of two plate surfaces of the light guide plate and through which the light exits the light guide plate, a display panel including two substrates sandwiching a liquid crystal layer therebetween and configured to display an image by using light from the light-exit surface, a first display section included in the display panel and located relatively away from the light source and in which the liquid crystal layer has a relatively large thickness, and a second display section included in the display panel and located relatively near the light source and in which at least a portion of the liquid crystal layer has a relatively small thickness.

In this configuration, the light from the light source enters the light guide plate through the light input end face and exits through the light-exit surface after traveling in the light guide plate. The light is used by the display panel to display an image. When the light rays are sufficiently mixed in the process of traveling in the light guide plate, the light rays of the same brightness and the same chromaticity exit the light guide plate through the light-exit surface. However, if the light rays are not sufficiently mixed, the light rays would have brightness unevenness and color unevenness. The region of the light-exit surface of the light guide plate relatively near the light source is likely to have brightness unevenness and color unevenness in the outgoing light compared with the region relatively away from the light source. Thus, the region of the display panel relatively near the light source, which mainly uses the outgoing light from the region of the light-exit surface relatively near the light source, is likely to have visible brightness unevenness and visible color unevenness compared with the region relatively away from the light source.

To overcome this problem, the first display section of the display panel, which is located relatively away from the light source and uses the outgoing light from the region of the light-exit surface of the light guide plate relatively away from the light source to display an image, has the liquid crystal layer having the relatively large thickness to have relatively high light transmittance, although the brightness unevenness and color unevenness are inherently less visible in the first display section. Thus, the brightness is sufficiently high in the first display section. In contrast, the second display section of the display panel, which is located relatively near the light source and uses the outgoing light from the region of the light-exit surface of the light guide plate near the light source to display an image, has the liquid crystal layer having the relatively small thickness over at least a portion to have relatively low light transmittance. Thus, brightness unevenness and color unevenness possibly caused in the outgoing display light from the light guide plate are less visible in the second display section. The above-described configuration allows the overall brightness to be kept high and provides high display quality. Furthermore, this configuration is less likely to have color unevenness than a conventional configuration including the color filter having the controlled thickness. Furthermore, compared with a conventional configuration that includes an additional light transmission control layer, this configuration, which does not include such a layer, requires a lower cost.

The following configurations are preferable aspects of the present invention.

(1) The light source includes light sources arranged at an interval in a line along the light input end face, and the second display section has a light source mounting display portion having at least portions corresponding to positions of the light sources in an arrangement direction of the light sources and in which the liquid crystal layer has a relatively small thickness and a light source non-mounting display portion not corresponding to the positions of the light sources in the arrangement direction and in which the liquid crystal layer has a relatively large thickness. The light source mounting display portion of the second display section, which has at least portions corresponding to the positions of the light sources in the arrangement direction of the light sources, is likely to receive too much light from the light-exit surface of the light guide plate and to be recognized as a bright portion. The light source non-mounting display portion of the second display section, which does not correspond to the positions of the light sources in the arrangement direction, is likely to receive insufficient amount of light from the light-exit surface of the light guide plate and to be recognized as a dark portion. To overcome this problem, the light source mounting display portion having the above-described configuration has the liquid crystal layer having a relatively small thickness to have a relatively low light transmittance, and thus the light source mounting display portion is not recognized as a bright portion although the amount of light supplied from the light-exit surface of the light guide plate is excessive. In contrast, the light source non-mounting display portion has the liquid crystal layer having the relatively small thickness to have relatively low light transmittance, and thus the light source non-mounting display portion is recognized as a dark portion although the amount of light from the light-exit surface of the light guide plate is insufficient. With the above-described configuration, the light source mounting display portion and the light source non-mounting display portion in the second display section are unlikely to have difference in brightness, improving the display quality.

(2) The liquid crystal layer in the light source non-mounting display portion has a thickness equal to that in the first display section. With this configuration, the light source non-mounting portion is further unlikely to be recognized as a dark portion. Furthermore, this configuration allows the light source non-mounting display portion and the first display section to have the same structure for keeping the thickness of the liquid crystal layer.

(3) The liquid crystal layer in the first display section has a thickness that maximizes the light transmittance. This configuration improves the brightness of the image on the display panel to the maximum, because the liquid crystal layer in the first display section farther away than the second display section from the light sources has the thickness that maximizes the light transmittance.

(4) The display panel includes spacers located between the substrates and extending through the liquid crystal layer, and the spacers include a first spacer located in the first display section and having a relatively large height and a second spacer located in at least a portion of the second display section and having a relatively small height. This configuration reduces the cost compared with a configuration in which the thickness of the liquid crystal layer is controlled by varying the thickness of an insulating film, which is on at least one of the substrates, between the first display section and the second display section.

(5) The display panel includes an insulating film on at least one of the substrates, and the insulating film includes at least a first insulating portion disposed over the first display section and having a relatively small thickness and a second insulating portion disposed over at least a portion of the second display section and having a relatively large thickness. This configuration allows the distance between the substrates to be kept constant. With this configuration, the substrates are less likely to be distorted at the border between the first display section and the second display section, and thus the display panel is less likely to have a visible display defect, such as pooling, when pressed by a user with a finger, for example.

Advantageous Effect of the Invention

The present invention reduces color unevenness and cost.

MODES FOR CARRYING OUT THE INVENTION

First Embodiment

A first embodiment of the invention is described with reference to FIGS. 1 to 11. In this embodiment, a liquid crystal display device 10 is described as an example. The X axis, the Y axis, and the Z axis are indicated in some of the drawings, and each of the axial directions indicates the same direction in the respective drawings. The upper side in FIG. 2 is a front side and the lower side in FIG. 2 is a rear side.

Figure 1:
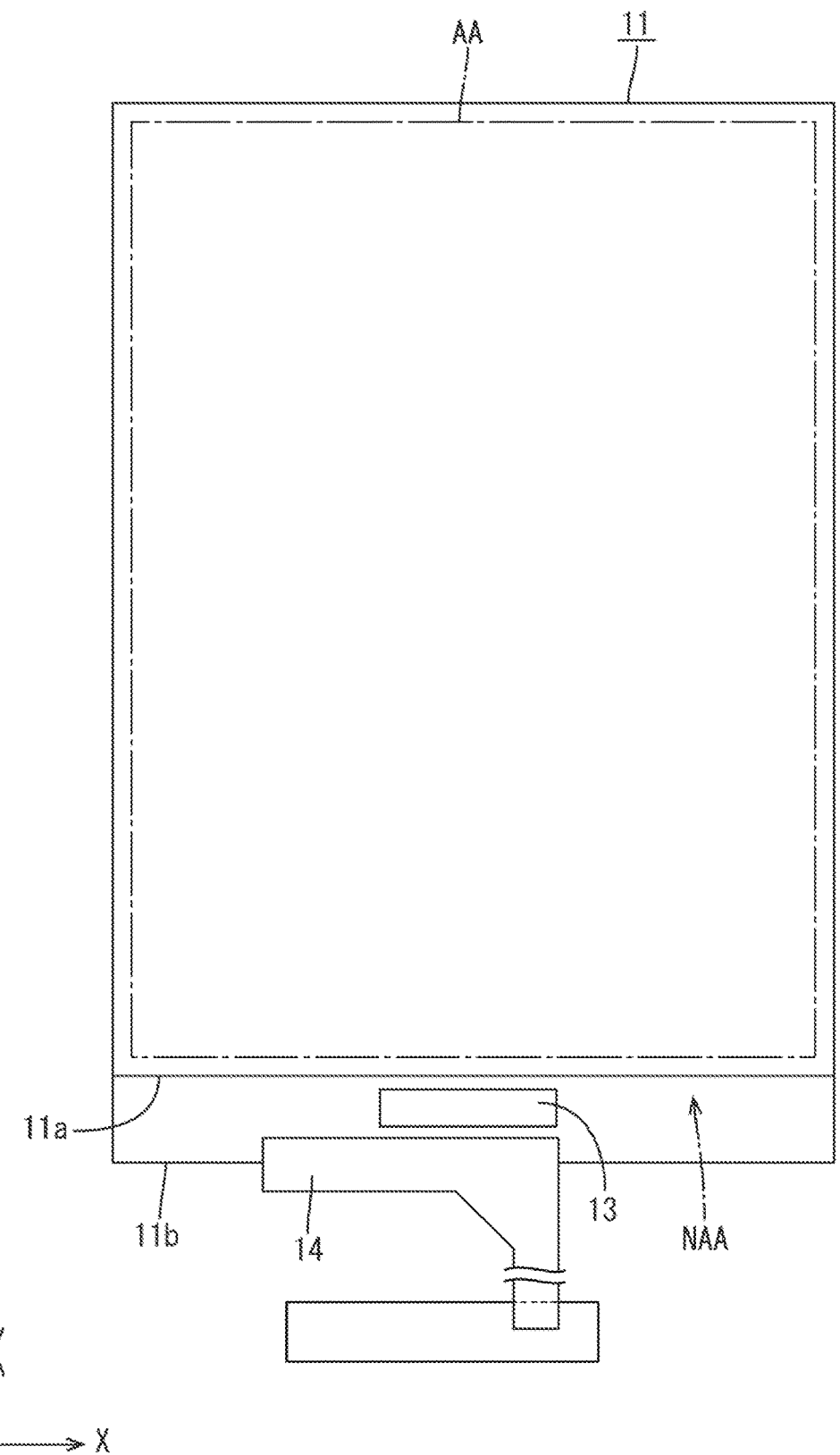
FIG. 1 is a schematic plan view illustrating a connection between a liquid crystal panel and a flexible board, which are included in a liquid crystal display device according to a first embodiment of the invention.
Figure 2:
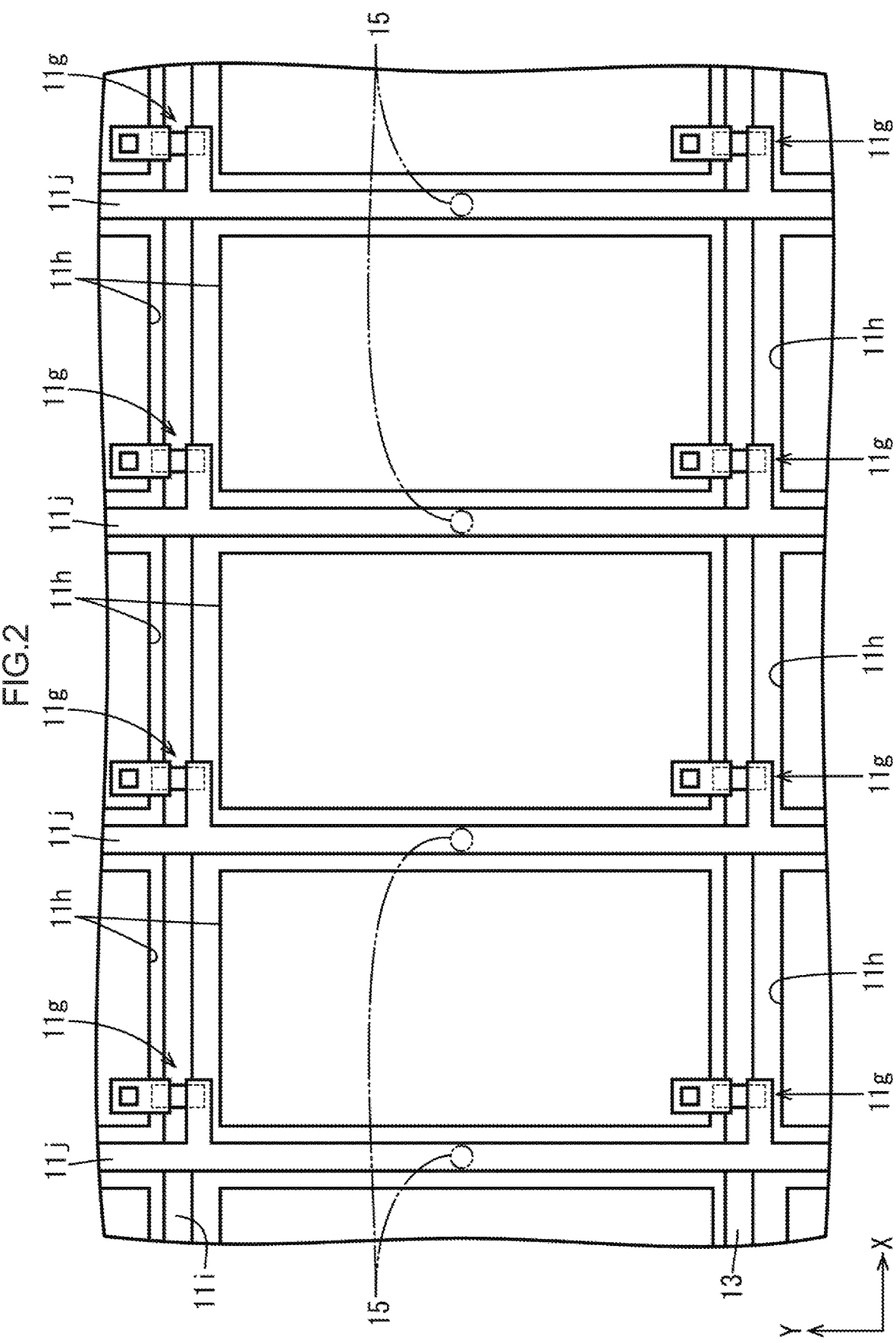
FIG. 2 is a plan view illustrating a display area of an array substrate included in the liquid crystal panel.
Figure 3:
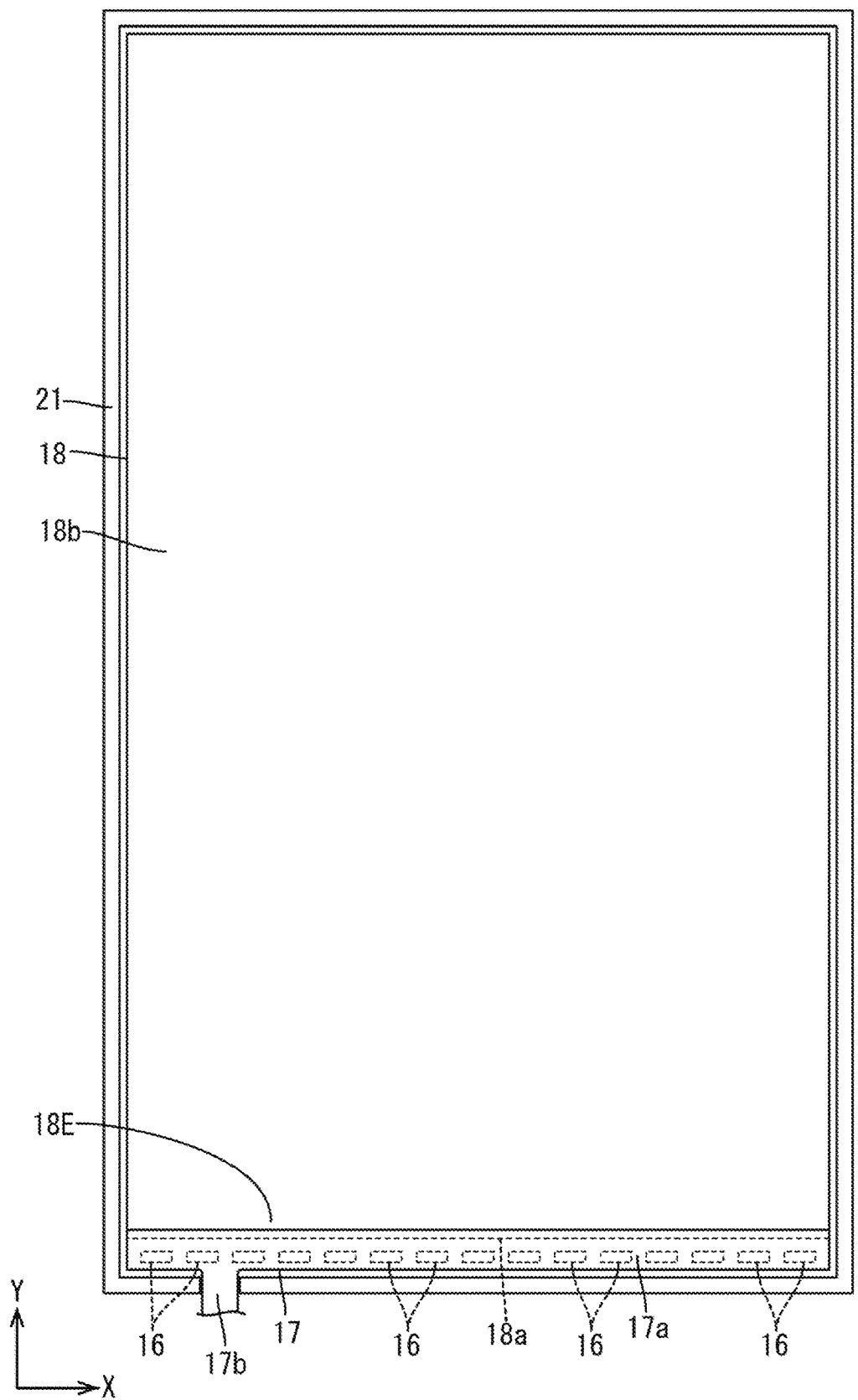
FIG. 3 is a plan view illustrating a backlight device included in the liquid crystal display device.
Figure 4:
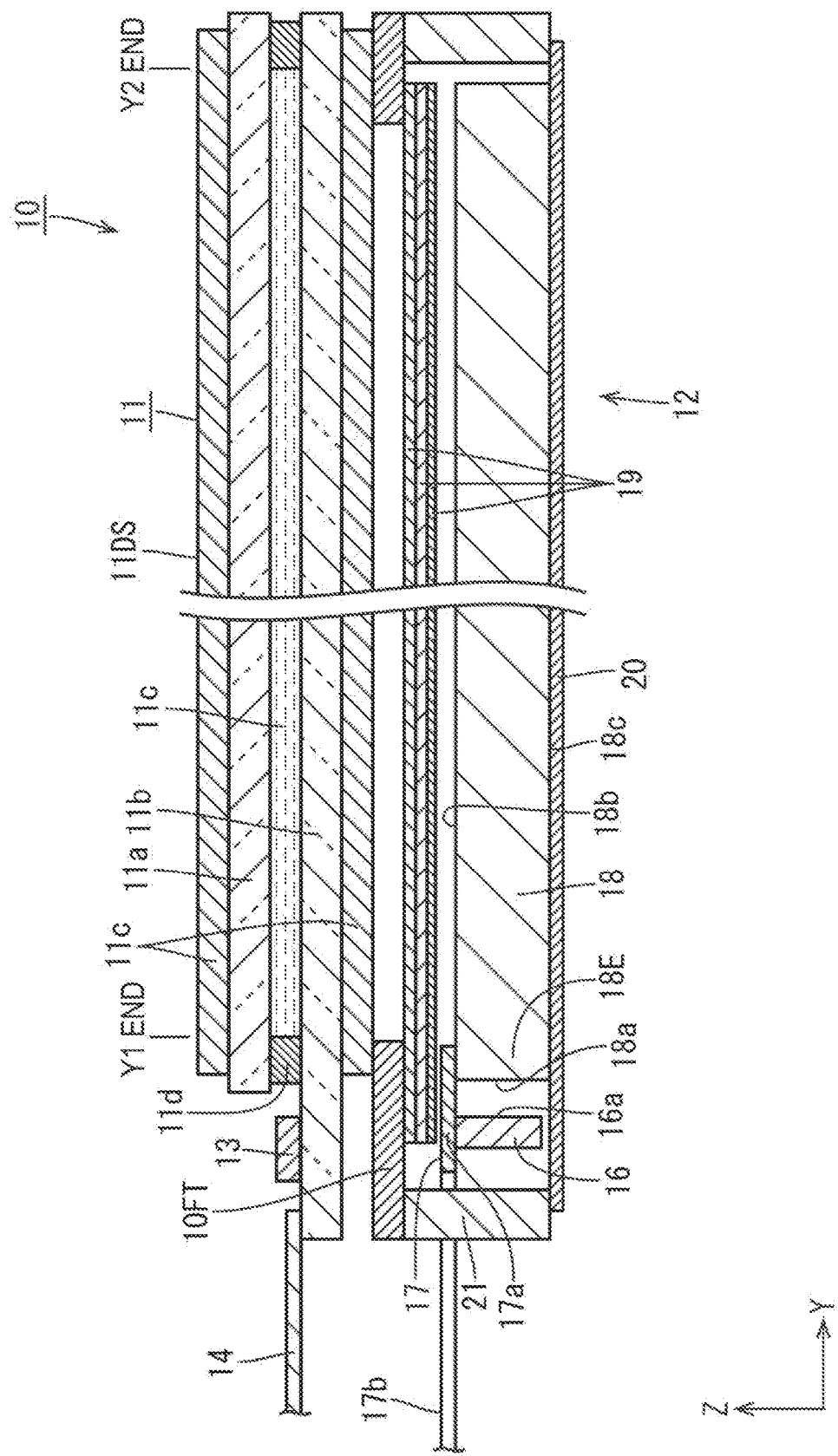
FIG. 4 is a schematic cross-sectional view illustrating the liquid crystal display device.

As illustrated in FIGS. 1 to 3, the liquid crystal display device 10 has a horizontally long rectangular overall shape and includes at least a liquid crystal panel (display panel) 11 having a display surface 11DS capable of displaying an image and a backlight device (lighting device) 12 located on the rear side of the liquid crystal panel 11. The backlight device 12 is an external light source configured to apply display light to the liquid crystal panel 11. As illustrated in FIG. 4, the liquid crystal panel 11 and the backlight device 12 are fixed together with a light-blocking fixing tape 10FT in a frame-like shape. The liquid crystal display device 10 of the embodiment is used in a mobile information terminal, such as a smartphone. Thus, the liquid crystal panel 11 included in the liquid crystal display device 10 has a screen size categorized as a small size in general (for example, a few inches).

As illustrated in FIGS. 1 and 4, the liquid crystal panel 11 includes at least two substantially transparent glass substrates 11a and 11b having high light transmittance, a liquid crystal layer 11c sandwiched between the substrates 11a and 11b and containing liquid crystal molecules, which are substances whose optical properties are changed by application of an electric field, a sealing member 11d surrounding the liquid crystal layer 11c and located between outer peripheral end portions of the substrates 11a and 11b to seal the liquid crystal layer 11c, and two polarizing plates 11e on the outer surfaces of the substrates 11a and 11b. One of the substrates 11a and 11b, which are included in the liquid crystal panel 11, on the front side (front surface side) is a CF substrate (counter substrate, common substrate) 11a and the other on the rear side (rear surface side) is an array substrate (display substrate, active matrix substrate, TFT board) 11b. The liquid crystal panel 11 has a display area (active area) AA capable of displaying an image in the middle of the display surface 11DS and a frame-shaped non-display area (non-active area) NAA surrounding the display area AA. In FIG. 1, a one-dot chain line indicates an outline of the display area AA, and an area outside the one-dot chain line is the non-display area NAA. A driver (driving circuit) 13 and a flexible board 14 are mounted in the non-display area NAA of the array substrate 11b to supply various signals to the display area AA. The substrates 11a and 11b each have an alignment film 11f, which aligns the liquid crystal molecules in the liquid crystal layer 11c, on the inner surface.

Figure 6:
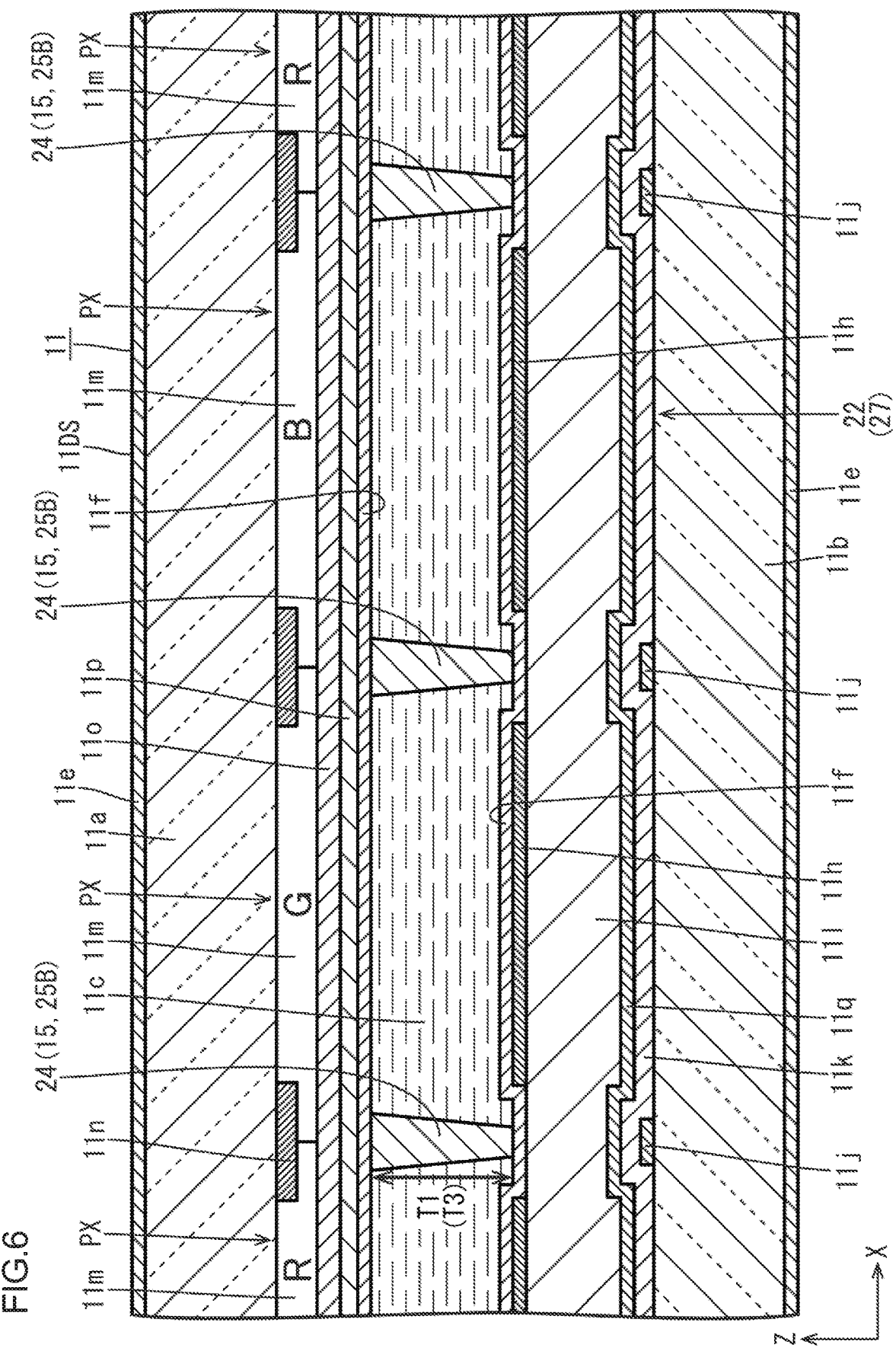
FIG. 6 is a cross-sectional view illustrating a first display section (LED non-mounting display portion) of the liquid crystal display panel.

As illustrated in FIG. 2, multiple thin film transistors (TFTs) 11g as switching devices and multiple pixel electrodes 11h are arranged in a matrix on an inner surface (adjacent to the liquid crystal layer 11c, facing the CF substrate 11a) of the array substrate 11b over the display area AA. The TFTs 11g and the pixel electrodes 11h are surrounded by multiple gate lines 11i extending in the X axis direction and multiple source lines (second lines) 11j extending in the Y axis direction. The pixel electrode 11h is formed of a transparent electrode, such as indium tin oxide (ITO). The pixel electrodes 11h each have a vertically long rectangular shape (quadrilateral shape) in plan view to fill the area defined by the gate lines 11i and the source lines 11j. The pixel electrodes 11h are charged to a predetermined potential (specifically, a potential corresponding to a signal supplied to the source lines 11j) by the TFTs 11g. Furthermore, as illustrated in FIG. 6, insulating films, such as a gate insulating film 11k, an interlayer insulating film 11q, and a flattening film 11l, are disposed on the inner surface of the array substrate 11b over the display area AA. The array substrate 11b may further have auxiliary capacitor lines (not illustrated) extending parallel to the gate lines 11i across the pixel electrodes 11h.

As illustrated in FIG. 6, red (R), green (G), and blue (B) color filters (coloring portions) 11m are disposed on the inner surface (adjacent to the liquid crystal layer 11c, facing the array substrate 11b) of the CF substrate 11a over the display area AA. The color filters 11m of different colors are repeatedly arranged along the gate lines 11i (in the X axis direction) and elongated along the source lines 11j (substantially in the Y axis direction) to form a striped pattern as a whole. The color filters 11m overlap the pixel electrodes 11h of the array substrate 11b in plan view. The border (color border) between the color filters 11m of different colors adjacent to each other in the X axis direction overlap the source line 11j and a light-blocking member 11n, which will be described later. In the liquid crystal panel 11, the R, G, and B color filters 11m arranged in the X axis direction and three of the pixel electrodes 11h facing the color filters 11m constitute pixels PX of three colors. In the liquid crystal panel 11, the pixels PX of R, G, and B adjacent to each other in the X axis direction constitute a display pixel capable of providing color display at a predetermined gray level.

As illustrated in FIG. 6, the CF substrate 11a has a light-blocking member (interpixel light-blocking member, black matrix) 11n that blocks light on the inner surface thereof over the display area AA. The light-blocking member 11n has a grid-like shape in a plan view and separates the adjacent pixels PX (pixel electrodes 11h). The light-blocking member 11n has openings overlapping the pixel electrodes 11h. The light-blocking member 11n prevents light from traveling between the adjacent pixels PX such that each pixel PX retains the independence of the gray level. In particular, the portions of the light-blocking member 11n extending along the source lines 11j prevent color mixture between the pixels PX of different colors. The light-blocking member 11n overlaps the gate lines 11i and the source lines 11j of the array substrate 11b in plan view.

As illustrated in FIG. 6, an overcoat film (insulating film) 11o is disposed on the inner surfaces of the color filters 11m. The overcoat film 11o is formed of an insulating material and disposed in a solid pattern over substantially the entire inner surface of the CF substrate 11a. The overcoat film 11o has a thickness substantially equal to or larger than that of the color filter 11m. A counter electrode 11p is disposed on the inner surface of the overcoat film 11o. The counter electrode 11p is disposed in a solid pattern over substantially the entire inner surface of the CF substrate 11a. The counter electrode 11p is formed of the same transparent electrode material as the pixel electrodes 11h and maintains a constant reference potential. Thus, when the TFTs 11g are driven and the pixel electrodes 11h connected to the TFTs 11g are charged, a potential difference occurs between the counter electrode 11p and the pixel electrodes 11h. The potential difference between the counter electrode 11p and the pixel electrodes 11h changes the alignment state of the liquid crystal molecules in the liquid crystal layer 11c. The change in the alignment state changes the polarization state of transmitted light. This allows the amount of light passing through the liquid crystal panel 11 to be controlled for each pixel PX and allows the liquid crystal panel 11 to display a color image.

As illustrated in FIG. 6, the liquid crystal panel 11 having such a configuration includes spacers (photo spacers) 15 disposed between the substrates 11a and 11b to keep the space therebetween. The spacers 15 are located in an area (mainly in the display area AA) of the liquid crystal panel 11 surrounded by the sealing member 11d. The spacer 15 has a columnar shape protruding from the alignment film 11f of the CF substrate 11a toward the array substrate 11b through the liquid crystal layer 11c and has a protrusion end in contact with the alignment film 11f of the opposing array substrate 11b. This allows the distance between the substrates 11a and 11b in the display area AA or the thickness of the liquid crystal layer 11c (cell gap, film thickness) to be kept constant. The height of the spacer 15 (dimension in a direction normal to the display surface 11DS) is substantially equal to the thickness of the liquid crystal layer 11c. The spacers 15 are regularly dispersed over the display area AA. Specifically described, the spacers 15 each overlap a portion of the source line 11j (a central portion in the Y axis direction of the pixel PX), which is a light-blocking region (FIG. 2), in this example. The spacers 15 are formed of a substantially transparent photosensitive resin material, for example, and are patterned by known photolithography in the production process of the CF substrate 11a.

Next, the backlight device 12 is described. As illustrated in FIGS. 3 and 4, the backlight device 12 includes at least light emitting diodes (LEDs) 16 as light sources, an LED board (light source board) 17 on which the LEDs 16 are mounted, a light guide plate 18 that guides light from the LEDs 16, an optical sheet (optical member) 19 on the front side of the light guide plate 18, a reflection sheet (reflection member) 20 on the rear side of the light guide plate 18, and a frame 21 having a frame-like shape and surrounding the components including the LEDs 16, the light guide plate 18, and the optical sheet 19. The backlight device 12 is an edge-lit (side-lit) backlight device in which light from the LEDs 16 enters the light guide plate 18 through only one side face at one end in the Y axis direction (long-side direction). Next, components of the backlight device 12 are described in detail.

As illustrated in FIGS. 3 and 4, the LEDs 16 each include a base fixed to the LED board 17 and an LED chip sealed onto the base by a sealing material. For example, the LED chip of each LED 16 emits a single-color light, such as blue light, and the sealing material contains a phosphor (such as a yellow phosphor, a green phosphor, and a red phosphor) in a dispersed state, and thus the LED 16 emits white light as a whole. The LED 16 is a side-lit LED in which the surface adjacent to the surface in contact with the LED board 17 is a light emitting surface 16a.

As illustrated in FIGS. 3 and 4, the LED board 17 is disposed on the front side of the frame 21 and the light guide plate 18 and located between the liquid crystal panel 11 and these components. The LED board 17 is a semi-transparent flexible film (sheet) formed of an insulating material and is generally yellowish. The LED board 17 has an LED mounting portion 17a extending in the X axis direction (long-side direction of the light input end face 18a) and having multiple (15 in FIG. 3) LEDs 16 arranged at an interval and a lead-out portion 17b extending from the LED mounting portion 17a in the Y axis direction to the outside of the frame 21. The rear surface of the LED board 17 has the LEDs 16 spaced apart from each other in the X axis direction and has patterned wiring lines (not illustrated) for supplying power to the LEDs 16.

The light guide plate 18 is formed of a substantially transparent synthetic resin (for example, an acrylic resin such as PMMA or polycarbonate) and has a refractive index sufficiently higher than that of air. As illustrated in FIGS. 3 and 4, the light guide plate 18 having a vertically long plate-like shape as the liquid crystal panel 11 is surrounded by the frame 21 along the side surfaces and is located directly below the liquid crystal panel 11 and the optical sheet 19. The long-side direction, the short-side direction, and the thickness direction of the light guide plate 18 respectively match the X axis direction, the Y axis direction, and the Z axis direction in the drawings. One of the outer end faces (left end face in FIG. 4) of the light guide plate 18 that is along one of the short sides is a light input end face (light source opposing end face) 18a facing the LEDs 16 to receive light from the LEDs 16. The light input end face 18a is parallel to the light-emitting surfaces 16a of the LEDs 16 and extends in a straight line in the X axis direction (arrangement direction of the LEDs 16). One of the plate surfaces of the light guide plate 18 that faces the front side (liquid crystal panel 11) is a light-exit surface 18b through which light is output toward the liquid crystal panel 11. One of the plate surfaces that faces the rear side is a light-exit opposite surface 18c opposite the light-exit surface 18b. The light-exit surface 18b is parallel to the plate surface (display surface 11DS) of the liquid crystal panel 11 and faces the plate surface of the liquid crystal panel 11 with the optical sheet 19, which will be described later, therebetween. In this configuration, the light guide plate 18 receives the light emitted from the LEDs 16 in the Y axis direction through the light input end face 18a and allows the light to travel therein and then upward in the Z axis direction such that the light exits through the light-exit surface 18b toward the optical sheet 19 and the liquid crystal panel 11 (front side, light exit side).

As illustrated in FIG. 4, the optical sheet 19 is located between the liquid crystal panel 11 and the light guide plate 18 and allows the outgoing light from the light guide plate 18 to travel therethrough toward the liquid crystal panel 11 while exerting predetermined optical effects on the light. The optical sheet 19 includes multiple sheets (three sheets in this embodiment). Specific examples of the optical sheets include a diffusing sheet, a lens sheet (prism sheet), and a reflective polarizing sheet. Any two or more of the sheets are suitably selected.

As illustrated in FIG. 4, the reflection sheet 20 covers the light-exit opposite surface 18c of the light guide plate 18. The reflection sheet 20 has high light reflectance and efficiently reflects light that has leaked out through the light-exit opposite surface 18c of the light guide plate 18 to the front side (toward the light-exit surface 18b). The light reflection sheet 20 is slightly larger in outer shape than the light guide plate 18 and is located such that an end portion thereof along one of the short sides protrudes from the light input end face 18a toward the LEDs 16.

The frame 21 is formed of a synthetic resin (for example, polycarbonate) and has a white surface. As illustrated in FIGS. 3 and 4, the frame 21 having a frame-like shape is slightly larger in outer shape than the light guide plate 18. The frame 21 collectively surrounds the LEDs 16 and the light guide plate 18. The adhesive rear surface of the above-described light-blocking fixing tape 10FT is fixed to the front surface of the frame 21. Thus, the frame 21 is fixed to the liquid crystal panel 11 using the fixing tape 10FT.

When the light rays are sufficiently mixed during travel through the light guide plate 18 illustrated in FIGS. 3 and 4, the light rays from the light-exit surface 18b of the light guide plate 18 have the same brightness and chromaticity. However, if the light rays are not sufficiently mixed, the light rays would have brightness unevenness and color unevenness. The color unevenness is described further in detail. In some cases, some of the LEDs 16 on the LED board 17 emit light different in chromaticity, and color unevenness occurs when the light rays are not sufficiently mixed. In comparison between the region of the light-exit surface 18b of the light guide plate 18 relatively near the LEDs 16 (specifically, a light input end portion 18E along a short-side end having the light input end face 18a) and the region relatively away from the LEDs 16 (specifically, a large portion other than the light input end portion 18E), the light from the former region, i.e., the light input end portion 18E, is likely to have brightness unevenness and color unevenness. The portion of the liquid crystal panel 11 relatively near the LEDs 16 uses the light output through the light-exit surface 18b of the light input end portion 18E located relatively near the LEDs 16 to display an image, and thus the portion is more likely to have visible brightness unevenness and visible color unevenness than the portion of the liquid crystal panel 11 relatively away from the LEDs 16.

Figure 7:
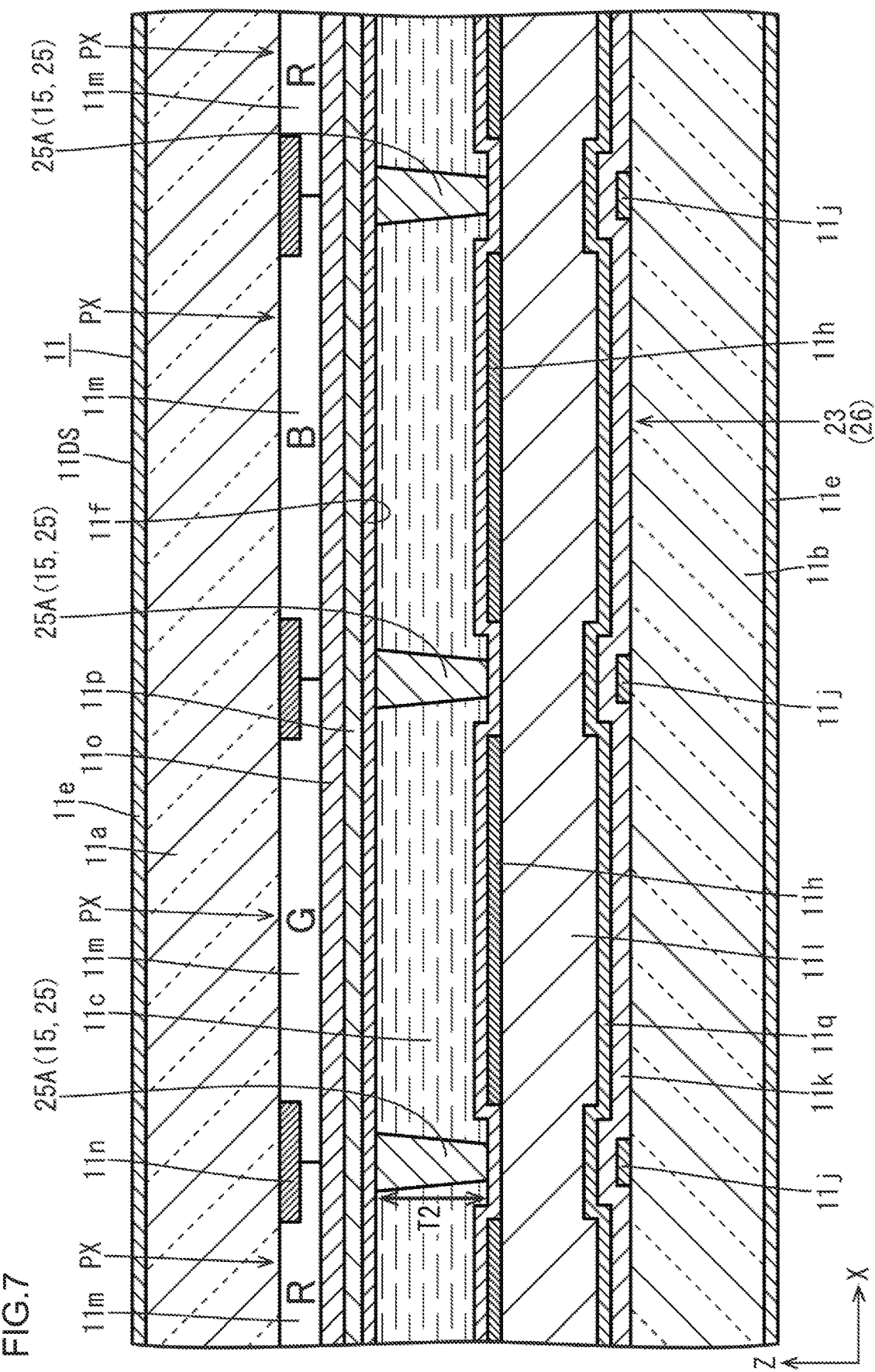
FIG. 7 is a cross-sectional view illustrating an LED mounting display portion of a second display section of the liquid crystal panel.
Figure 8:
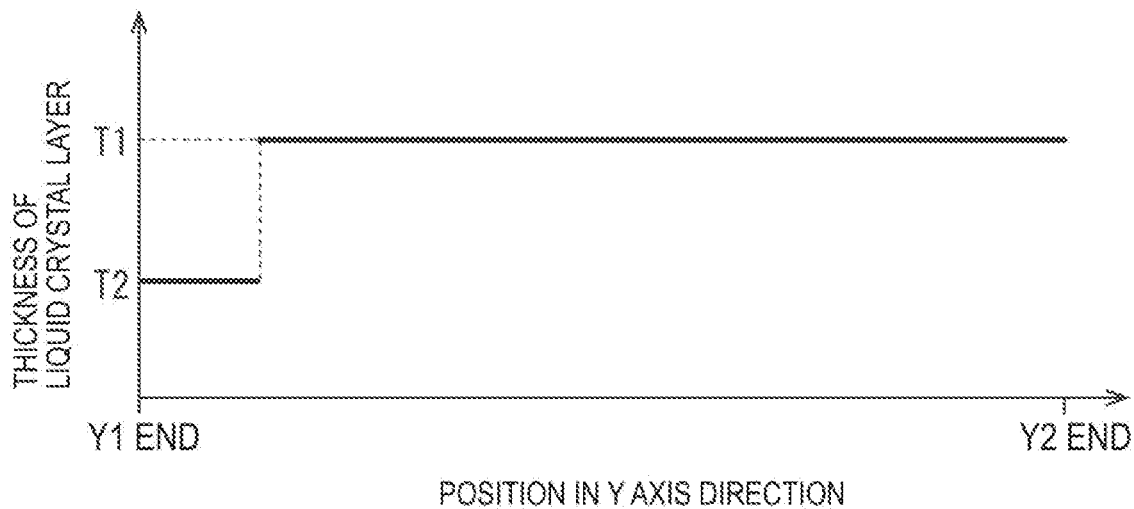
FIG. 8 is a graph indicating thickness distribution in the liquid crystal layer from a Y1 end to a Y2 end of the liquid crystal panel.

To overcome the problem, as illustrated in FIGS. 6 to 8, the liquid crystal panel 11 according to this embodiment has a first display section 22 located relatively away from the LEDs 16 and in which the thickness T1 of the liquid crystal layer 11c is relatively large and a second display section 23 located relatively near the LEDs 16 and in which the thickness T2 of the liquid crystal layer 11c is relatively small over at least a portion (LED mounting display portion, which will be described later). FIG. 8 schematically illustrates thickness distribution in the liquid crystal layer 11c over the first display section 22 and the second display section 23 of the liquid crystal panel 11. The vertical axis in FIG. 8 indicates a thickness of the liquid crystal layer 11c and the horizontal axis in FIG. 8 indicates a position in the Y axis direction (Y1 end and Y2 end in FIG. 4).

As indicated in FIGS. 6 and 8, the first display section 22 of the liquid crystal panel 11 overlaps a large part of the light guide plate 18 other than the light input end portion 18E in plan view. The first display section 22 displays an image by using light from a region of the light-exit surface 18b of the light guide plate 18 relatively away from the LEDs 16, i.e., light from a portion other than the light input end portion 18E. In other words, the first display section 22 displays an image by using a portion of outgoing light from the light-exit surface 18b of the light guide plate 18 that is unlikely to have brightness unevenness and color unevenness, and visible brightness unevenness and visible color unevenness are inherently unlikely to occur. In addition, the first display section 22 has the liquid crystal layer 11c having the relatively large thickness T1 to have relatively high light transmittance, and thus sufficient brightness is provided over the entire display surface 11DS. In contrast, as illustrated in FIGS. 7 and 8, the second display section 23 of the liquid crystal panel 11 overlaps the light input end portion 18E of the light guide plate 18 in plan view. The second display section 23 displays an image by using outgoing light from a region of the light-exit surface 18b of the light guide plate 18 relatively near the LEDs 16, i.e., the light input end portion 18E. In other words, the second display section 23 displays an image by using a portion of outgoing light from the light-exit surface 18b of the light guide plate 18 that is likely to have brightness unevenness and color unevenness. However, the second display section 23 has the liquid crystal layer 11c having the relatively small thickness T2 over at least a portion to have relatively low light transmittance, and thus visible brightness unevenness and visible color unevenness are less likely to occur in the outgoing light from the light-exit surface 18b. With this configuration, a sufficient degree of overall brightness and high display quality are both obtained. Furthermore, although a conventional configuration including the color filter having a controlled thickness is likely to have color unevenness, this configuration is less likely to have color unevenness in principle. Furthermore, this configuration does not include an additional light transmission control layer, which is included in a conventional configuration, leading to a reduction in the cost.

Figure 10:
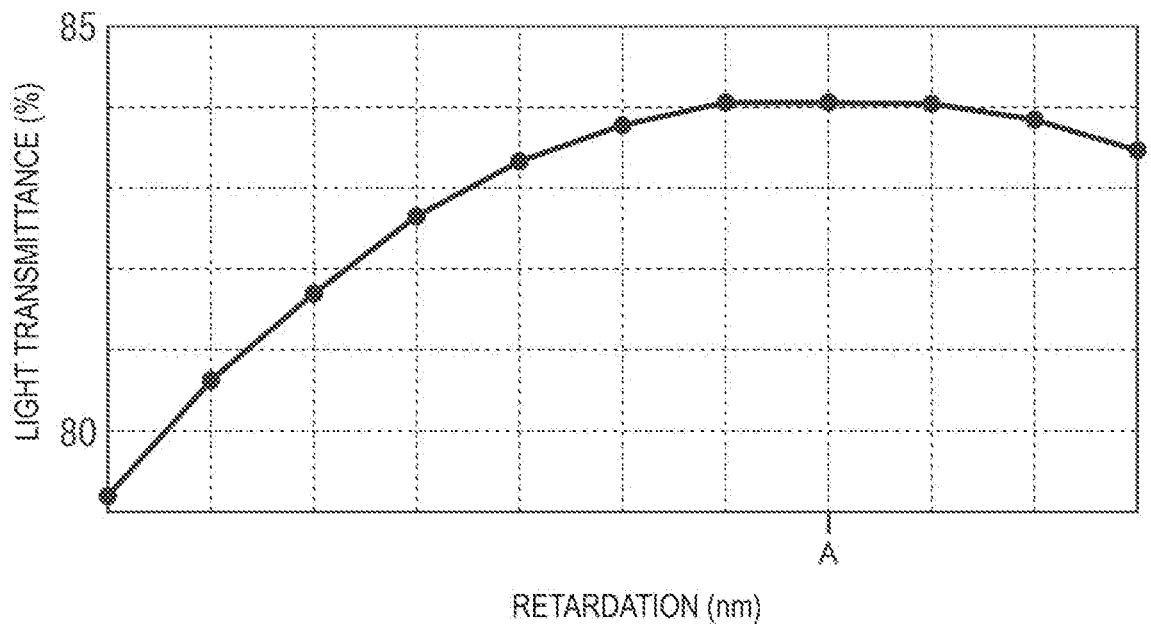
FIG. 10 is a graph indicating a relationship between retardation in the liquid crystal layer of the liquid crystal panel and transmittance of green light.
Figure 11:
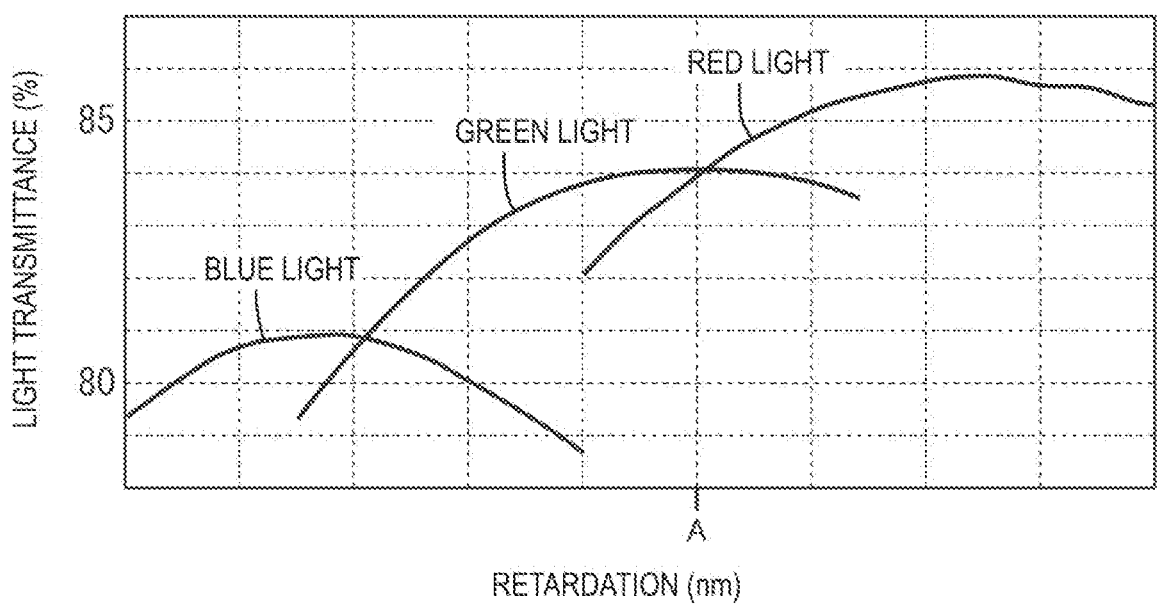
FIG. 11 is a graph indicating relationships between retardation in the liquid crystal layer of the liquid crystal panel and transmittance of each of blue light, green light, and red light.

Here, the relationship between the thickness of the liquid crystal layer 11c and the light transmittance is described with reference to FIGS. 10 and 11. FIG. 10 is a graph indicating the relationship between the retardation in the liquid crystal layer 11c of the liquid crystal panel 11 and the transmittance of green light (wavelength of 550 nm), which contributes the most to the brightness. FIG. 11 is a graph indicating the relationships between the retardation in the liquid crystal layer 11c of the liquid crystal panel 11 and the transmittance of blue light (wavelength of 460 nm), the transmittance of green light, and the transmittance of red light (wavelength of 620 nm). In FIGS. 10 and 11, the vertical axis indicates the light transmittance (%) and the horizontal axis indicates the retardation (nm) in the liquid crystal layer 11c. The equation "$\delta = \Delta n \cdot d$" is satisfied where $\delta$ is the retardation in the liquid crystal layer 11c, $\Delta n$ is the refractive-index anisotropy of the liquid crystal layer 11, and d is the thickness of the liquid crystal layer 11c. In this embodiment, $\Delta n$ is a constant value of, for example, "0.1", and thus the retardation in the liquid crystal layer 11c depends only on the thickness of the liquid crystal layer 11c. As indicated in FIG. 10, when the retardation (thickness of the liquid crystal layer 11c) is a predetermined value "A", the light transmittance is the maximum, and when the retardation is smaller or larger than the predetermined value, the light transmittance is smaller than the maximum. In this embodiment, the thickness T1 of the liquid crystal layer 11c in the first display section 22 is obtained at the retardation value "A", maximizing the transmittance of green light through the first display section 22. This increases the brightness of an image to be displayed on the display surface 11DS of the liquid crystal panel 11 to the maximum. In contrast, the thickness T2 of the liquid crystal layer 11c in the second display section 23 is smaller than the thickness T1 of the liquid crystal layer 11c in the first display section 22, and thus the retardation value of the liquid crystal layer 11c in the second display section 23 is smaller than the value "A". Thus, the transmittance of green light through the second display section 23 is lower than that through the first display section 22. In this configuration, the second display section 23 is less likely to have visible brightness unevenness and visible color unevenness. With reference to FIG. 10, although the liquid crystal layer 11c having a thickness larger than "T1" has a lower light transmittance, the response speed of the liquid crystal layer 11c is likely to decrease as the thickness of the liquid crystal layer 11c increases. Thus, the liquid crystal layer 11c having a thickness larger than "T1" is unpractical.

As indicated in FIG. 11, compared with the transmittance of green light, the transmittance of red light is generally high and the transmittance of blue light is generally low. As described above, the retardation value in the liquid crystal layer 11c over the second display section 23 is lower than "A", which is the retardation value in the liquid crystal layer 11c over the first display section 22. The transmittance of green light and the transmittance of red light in the second display section 23 are lower than those in the first display section 22, but the transmittance of blue light in the second display section 23 is higher than that in the first display section 22. In other words, the light transmitted through the second display section 23 is likely to be bluish. Here, some of the light emitted from the light emitting surface 16a of the LED 16 is directly applied to the light input end face 18a of the light guide plate 18, but some of the light therefrom is reflected by the light input end face 18a and then returned to the light input end face 18a. The latter includes light passed through the yellowish LED board 17. When the light that has become yellowish after passing through the LED board 17 enters the light guide plate 18 through the light input end face 18a and exits through the light-exit surface 18b of the light input end portion 18E, the yellowish light becomes blueish in the process of passing through the second display section 23. Blue is a complementary color of yellow. Thus, the outgoing light from the second display section 23 is likely to be whitened and have no color. As described above, the first display section 22 and the second display section 23 are unlikely to have color unevenness in the outgoing light.

In this embodiment, as illustrated in FIGS. 6 and 7, the spacers 15, which are components for keeping the thicknesses T1 and T2, have different heights such that the liquid crystal layer 11c has the different thicknesses T1 and T2 in the first display section 22 and the second display section 23 of the liquid crystal panel 11. In other words, the spacers 15 at least include a first spacer 24 having a relatively large height and located in the first display section 22 and a second spacer 25 having a relatively small height and located in the second display section 23. The height of the first spacer 24 is substantially equal to the thickness T1 of the liquid crystal layer 11c in the first display section 22. The height of the second spacer 25 is substantially equal to the thickness T2 of the liquid crystal layer 11c in the second display section 23. In this way, the thickness of the liquid crystal layer 11c is controlled by varying the height of the spacers 15 between the first display section 22 and the second display section 23. This reduces the cost compared with a configuration in which the thickness of the liquid crystal layer 11c is controlled by varying the thickness of the overcoat film on the CF substrate 11a, which is one of the substrates 11a and 11b, between the first display section 22 and the second display section 23.

Figure 9:
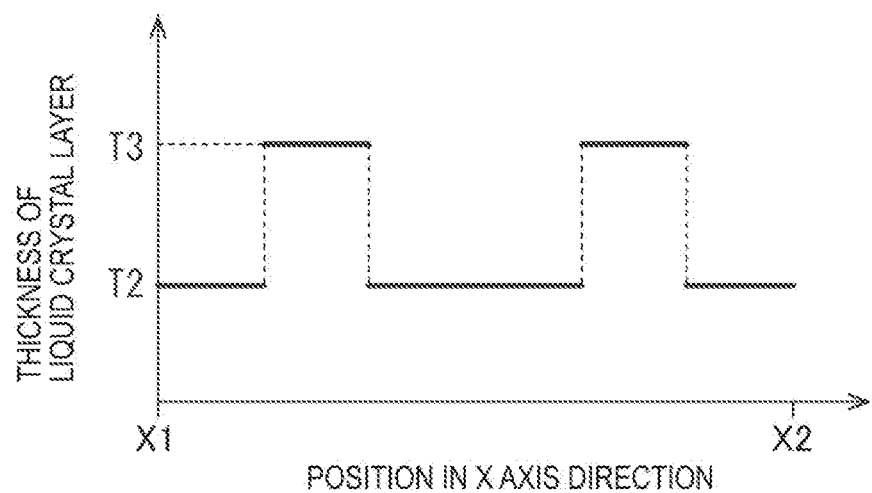
FIG. 9 is a graph indicating thickness distribution in the liquid crystal layer from X1 to X2 of the liquid crystal panel.

As illustrated in FIGS. 5 to 7 and FIG. 9, the second display section 23 has an LED arrangement portion (light source mounting display portion) 26 having at least portions corresponding to the positions of the LEDs 16 in the X axis direction (arrangement direction of the LEDs 16) and in which the thickness T2 of the liquid crystal layer 11c is relatively small and an LED non-mounting portion (light source non-mounting portion) 27 not corresponding to the positions of the LEDs 16 (offset) in the X axis direction and in which the thickness T3 of the liquid crystal layer 11c is relatively large. FIG. 6, which illustrates the cross-section of the first display section 22, is also applicable as the cross-sectional view of the LED non-mounting display portion 27 of the second display section 23. FIG. 9 schematically indicates the thickness distribution in the liquid crystal layer 11c in the second display section 23 of the liquid crystal panel 11. The vertical axis in FIG. 9 indicates the thickness of the liquid crystal layer 11c and the horizontal axis in FIG. 9 indicates the position in the X axis direction (X1 and X2 in FIG. 5).

Figure 5:
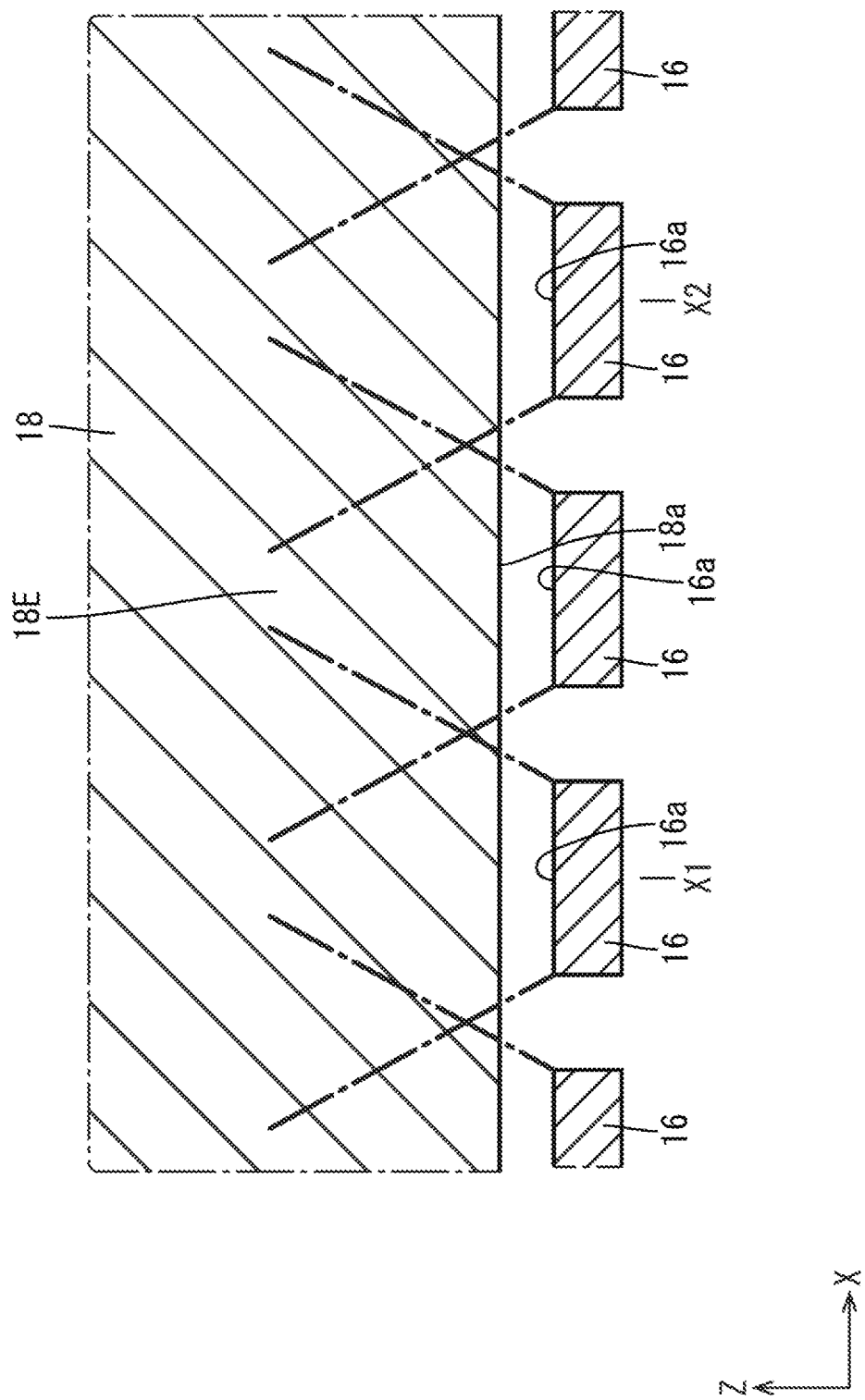
FIG. 5 is a magnified plan cross-sectional view illustrating LEDs and a nearby component of the backlight device.

As illustrated in FIG. 5, the amount of light applied from the LEDs 16 to the light input end portion 18E of the light guide plate 18, which guides the display light to the second display section 23, is different between the portions corresponding to the LEDs 16 in the X axis direction and portions not corresponding to the LEDs 16 in the X axis direction. The former is likely to receive too much light and the latter is likely to receive insufficient amount of light. The LED mounting display portion 26 of the second display section 23 mainly uses light from the light input end portion 18E of the light guide plate 18 through the portions of the light-exit surface 18b that correspond to the LEDs 16 in the X axis direction. Thus, the LED mounting display portion 26 is likely to receive too much light and to be recognized as a bright portion. In contrast, the LED non-mounting portion 27 of the second display section 23 generally uses light from the light input end portion 18E of the light guide plate 18 through the portions of the light-exit surface 18b that do not correspond to the LEDs 16 in the X axis direction. Thus, the portion is likely to receive an insufficient amount of light and to be recognized as a dark portion. However, in the above-described LED mounting display portion 26, the liquid crystal layer 11c has the relatively small thickness T2 to have relatively small light transmittance, and thus the portions of the light input end portion 18E of the light guide plate 18 corresponding to the LEDs 16 in the X axis direction are less likely to be recognized as bright portions although the amount of light applied from the light-exit surface 18b thereto is excessive. In contrast, in the LED non-mounting display portion 27, the liquid crystal layer 11c has the relatively large thickness T3 to have relatively large light transmittance, and thus the portions of the light input end portion 18E of the light guide plate 18 not corresponding to the LEDs 16 in the X axis direction are less likely to be recognized as dark portions even if the amount of light applied from the light-exit surface 18b thereto is not enough. As described above, a difference in brightness is less likely to occur between the LED mounting display portion 26 and the LED non-mounting portion 27 in the second display section 23, improving display quality. In particular, the thickness T3 of the liquid crystal layer 11c in the LED non-mounting portion 27 is the same as the thickness T1 of the liquid crystal layer 11c in the first display portion 22. Thus, the LED non-mounting display portion 27 is less likely to be recognized as a dark portion. Furthermore, this configuration allows the LED non-mounting display portion 27 and the first display section 22 to have the same structure for keeping the thickness of the liquid crystal layer 11c.

As illustrated in FIGS. 6 and 7, the second spacers 25 in the second display section 23 include LED mounting display portion spacers 25A disposed in the LED mounting display portion 26 and having a relatively small height and LED non-mounting display portion spacers 25B disposed in the LED non-mounting display portion 27 and having a relatively large height. The height of the LED mounting display portion spacer 25A is substantially equal to the thickness T2 of the liquid crystal layer 11c in the LED mounting display portion 26. The height of the LED non-mounting display portion spacer 25B is substantially equal to the thickness T3 of the liquid crystal layer 11c in the LED non-mounting display portion 27. In this embodiment, the thickness T1 of the liquid crystal layer 11c in the first display section 22 and the thickness T3 thereof in the LED non-mounting display portion 27 are the same, allowing the first spacers 24 and the LED non-mounting display portion spacers 25B to have the same height and thus have the same structure.

As described above, the liquid crystal display device (display device) 10 of the embodiment includes the LEDs (light sources) 16, the light guide plate 18 having the light input end face 18a that is at least a portion of an outer peripheral end surface and through which light from the LEDs 16 enters the light guide plate 18 and the light-exit surface 18b that is one of two plate surfaces of the light guide plate 18 and through which the light exits the light guide plate 18, the display panel (display panel) 11 including two substrates 11a and 11b sandwiching the liquid crystal layer 11c therebetween and configured to display an image by using light from the light-exit surface 18b, the first display section 22 included in the display panel 11 and located relatively away from the LED 16 and in which the liquid crystal layer 11c has a relatively large thickness T1, and the second display section 23 included in the display panel 11 and located relatively near the LED 16 and in which at least a portion of the liquid crystal layer 11c has a relatively small thickness T2.

In this configuration, the light from the LED 16 enters the light guide plate 18 through the light input end face 18a and exits through the light-exit surface 18b after traveling in the light guide plate 18. The light is used by the liquid crystal panel 11 to display an image. When the light rays are sufficiently mixed in the process of traveling in the light guide plate 18, the light rays of the same brightness and the same chromaticity exit the light guide plate 18 through the light-exit surface 18b. However, if the light rays are not sufficiently mixed, the light rays would have brightness unevenness and color unevenness. The region of the light-exit surface 18b of the light guide plate 18 relatively near the LEDs 16 is likely to have brightness unevenness and color unevenness in the outgoing light compared with the region relatively away from the LEDs 16. Thus, the region of the liquid crystal panel 11 relatively near the LEDs 16, which mainly uses the outgoing light from the region of the light-exit surface 18b relatively near the LEDs 16, is likely to have visible brightness unevenness and visible color unevenness compared with the region relatively away from the LEDs 16.

To overcome this problem, the first display section 22 of the liquid crystal panel 11, which is located relatively away from the LEDs 16 and uses the outgoing light from the region of the light-exit surface 18b of the light guide plate 18 relatively away from the LEDs 16 to display an image, has the liquid crystal layer 11c having the relatively large thickness T1 to have relatively high light transmittance, although the brightness unevenness and color unevenness are inherently less visible in the first display section 22. Thus, the brightness is sufficiently high in the first display section 22. In contrast, the second display section 23 of the liquid crystal panel 11, which is located relatively near the LEDs 16 and uses the outgoing light from the region of the light-exit surface 18b of the light guide plate 18 near the LEDs 16 to display an image, has the liquid crystal layer 11c having the relatively small thickness T2 over at least a portion to have relatively low light transmittance. Thus, brightness unevenness and color unevenness possibly caused in the outgoing display light from the light guide plate 18 are less visible in the second display section 23. The above-described configuration allows the overall brightness to be kept high and provides high display quality. Furthermore, this configuration is less likely to have color unevenness than a conventional configuration including the color filter having a controlled thickness. Furthermore, compared with a conventional configuration that includes an additional light transmission control layer, this configuration, which does not include such a layer, requires a lower cost.

Furthermore, the LEDs 16 are arranged at an interval in a line along the light input end face 18a. The second display section 23 includes the LED mounting display portion (light source mounting display portion) 26 having at least portions corresponding to positions of the LEDs 16 in the arrangement direction of the LEDs 16 and in which the liquid crystal layer 11c has the relatively small thickness T2 and the LED non-mounting display portion (light source non-mounting display portion) 27 not corresponding to the positions of the LEDs 16 in the arrangement direction and in which the liquid crystal layer 11c has the relatively large thickness T3. The LED mounting display portion 26 of the second display section 23, which has at least portions corresponding to the positions of the LEDs 16 in the arrangement direction of the LEDs 16, is likely to receive too much light from the light-exit surface 18b of the light guide plate 18 and to be recognized as a bright portion. The LED non-mounting display portion 27 of the second display section 23, which does not correspond to the LEDs 16 in the arrangement direction, is likely to receive insufficient amount of light from the light-exit surface 18b of the light guide plate 18 and is likely to be recognized as a dark portion. To overcome this problem, the LED mounting display portion 26 having the above-described configuration has the liquid crystal layer 11c having the relatively small thickness T2 to have relatively low light transmittance, and thus the LED mounting display portion 26 is not be recognized as a bright portion although the amount of light supplied from the light-exit surface 18b of the light guide plate 18 is excessive. In contrast, the LED non-mounting display portion 27 has the liquid crystal layer 11c having the relatively small thickness T2 to have relatively low light transmittance, and thus the LED non-mounting display portion 27 is be recognized as a dark portion although the amount of light from the light-exit surface 18b of the light guide plate 18 is insufficient. With the above-described configuration, the LED mounting display portion 26 and the LED non-mounting display portion 27 in the second display section 23 are unlikely to have difference in brightness, improving the display quality.

Furthermore, the thickness T3 of the liquid crystal layer 11c in the LED non-mounting display portion 27 is equal to the thickness of the liquid crystal layer 11c in the first display section 22. With this configuration, the LED non-mounting portion 27 is further unlikely to be recognized as a dark portion. Furthermore, this configuration allows the LED non-mounting display portion 27 and the first display section 22 to have the same structure for keeping the liquid crystal layer 11c at the thickness T1 or T3.

Furthermore, the liquid crystal layer 11c in the first display section 22 has the thickness T1 that maximizes the light transmittance. This configuration improves the brightness of the image on the liquid crystal panel 11 to the maximum, because the liquid crystal layer 11c in the first display section 22 farther away than the second display section 23 from the LEDs 16 has the thickness T1 that maximizes the light transmittance.

Furthermore, the liquid crystal panel 11 includes the spacers 15 located between the substrates 11a and 11b and extending through the liquid crystal layer 11c. The spacers 15 include at least the first spacers 24 located in the first display section 22 and having a relatively large height and the second spacers 25 located at least in a portion of the second display section 23 and having a relatively small height. This configuration reduces the cost compared with a configuration in which the thickness of the liquid crystal layer 11c is controlled by varying the thickness of the insulating film, which is on at least one of the substrates 11a and 11b, between the first display section 22 and the second display section 23.

Second Embodiment

A second embodiment of the invention is described with reference to FIG. 12 or 13. In the second embodiment, the thickness of the liquid crystal layer 111c is controlled by a different method. The same components, effects, and advantages as those in the first embodiment are not described.

Figure 12:
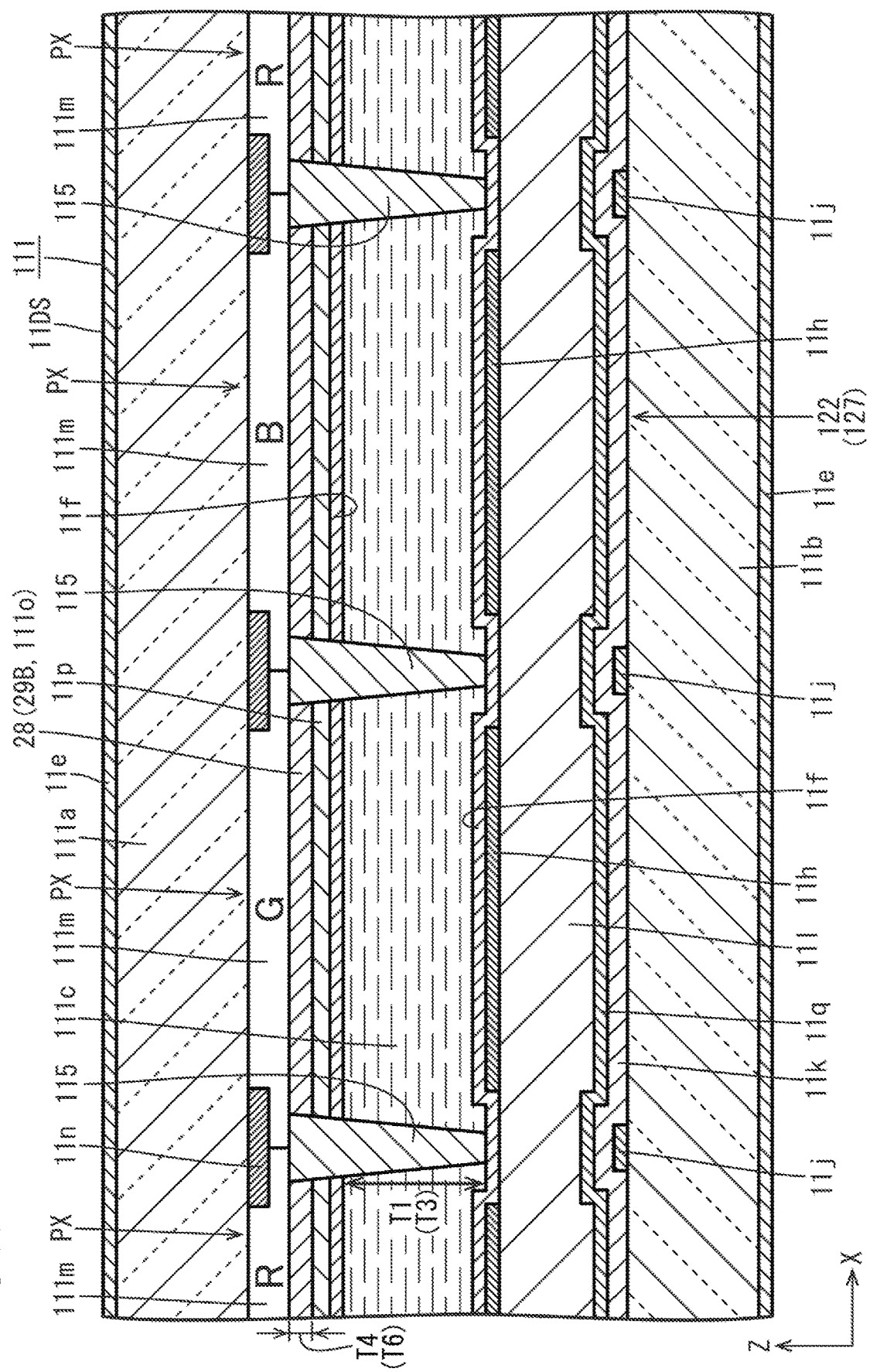
FIG. 12 is a cross-sectional view of a first display section (LED non-mounting display portion) of a liquid crystal panel according to a second embodiment of the invention.
Figure 13:
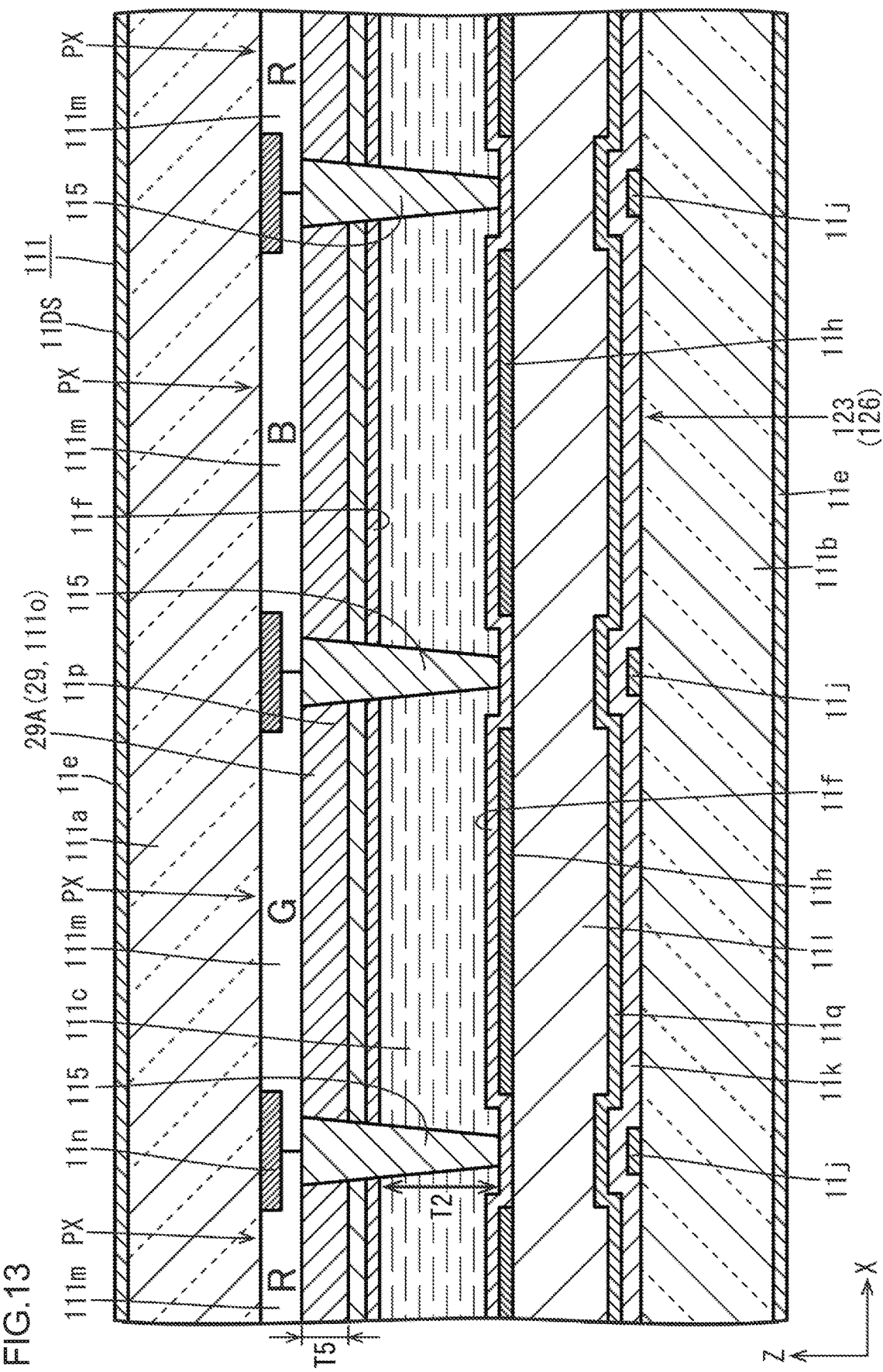
FIG. 13 is a cross-sectional view illustrating an LED mounting display portion of a second display section of the liquid crystal panel.

As illustrated in FIGS. 12 and 13, in the liquid crystal panel 111 of this embodiment, the thicknesses T1 and T2 of the liquid crystal layer 111c are controlled by varying the thickness of the overcoat film 111o on the CF substrate 111a, which is one of the substrates 111a and 111b, between the first display section 122 and the second display section 123. Specifically described, the overcoat film 111o includes at least a first insulating portion 28 disposed over the first display section 122 and having a relatively small thickness T4 and a second insulating portion 29 disposed over at least a portion of the second display section 123 and having a relatively large thickness T5. For example, the overcoat film 111o having the first insulating portion 28 and the second insulating portion 29 in different thicknesses T4 and T5 may be formed by repeatedly applying a material of the overcoat film 111o onto the CF substrate 111a. The application process may include applying the material to the entire area of the CF substrate 111a and selectively applying the material to the formation area of the second insulating portion 29. In the first display section 122, the thickness T4 of the first insulating portion 28 is smaller than the thickness T5 of the second insulating portion 29, and thus the thickness T1 of the liquid crystal layer 111c in the first display section 122 larger than the thickness T2 of the liquid crystal layer 111c in the second display section 123. In contrast, in the second display section 123, the thickness T5 of the second insulating portion 29 is larger than the thickness T4 of the first insulating portion 28, and thus the thickness T2 of the liquid crystal layer 111c in the second display section 123 is smaller than the thickness T1 of the liquid crystal layer 111c in the first display section 122. This configuration allows the distance between the substrates 111a and 111b to be kept constant. Thus, the substrates 111a and 111b are less likely to be distorted at the border between the first display section 122 and the second display section 123, and thus the liquid crystal panel 111 is less likely to have a visible display defect, such as pooling, when pressed by a user with a finger, for example. The spacers 115 protrude from the front surface of the color filters 111m toward the array substrate 111b and all have the same height regardless of the positions in the liquid crystal panel 111.

As illustrated in FIGS. 12 and 13, the second insulating portion 29 includes a second insulating portion for LED mounting display portion 29A disposed in the LED mounting display portion 126 and having a relatively large thickness T5 and a second insulating portion for LED non-mounting display portion 29B disposed in the LED non-mounting display portion 127 and having a relatively small thickness T6. As in the first embodiment, the thickness T1 of the liquid crystal layer 111c in the first display section 122 and the thickness T3 thereof in the LED non-mounting display portion 127 are the same, and thus the thickness T4 of the first insulating portion 28 and the thickness T6 of the second insulating portion for LED non-mounting display portion 29B are the same, allowing the first display section 122 and the LED non-mounting display portion 127 to have the same structure.

As described above, the liquid crystal panel 111 includes the overcoat film (insulating film) 111o on at least one of the substrates 111a and 111b. The overcoat film 111o has at least the first insulating portion 28 disposed over the first display section 122 and having the relatively small thickness T4 and the second insulating portion 29 disposed over at least a portion of the second display section 123 and having the relatively large thickness T5. This configuration allows the distance between the substrates 111a and 111b to be kept constant. With this configuration, the substrates 111a and 111b are less likely to be distorted at the border between the first display section 122 and the second display section 123, and thus the liquid crystal panel 111 is less likely to have a visible display defect, such as pooling, when pressed by a user with a finger, for example.

Other Embodiments

The present invention is not limited to the embodiments described above and illustrated by the drawings. For example, the following embodiments will be included in the technical scope of the present invention.

(1) In the above-described embodiments, the liquid crystal layer in the first display section has a thickness that maximizes the light transmittance. However, the liquid crystal layer in the first display section may have a thickness that does not maximize the light transmittance.

(2) In the above-described embodiments, the thickness of the liquid crystal layer at the LED non-mounting display portion of the second display section is equal to the thickness of the liquid crystal layer in the first display section. However, the thickness of the liquid crystal layer at the LED non-mounting display portion of the second display section may be larger or smaller than the thickness of the liquid crystal layer in the first display section.

(3) In the above-described embodiments, the thickness of the liquid crystal layer discontinuously varies (varies in stages) from the first display section to the LED mounting display portion of the second display section. However, the thickness of the liquid crystal layer may continuously vary from the first display section to the LED mounting display portion of the second display section.

(4) In the second embodiment, the thickness of the liquid crystal layer is controlled by varying the thickness of the overcoat film of the CF substrate. However, the thickness of the liquid crystal layer may be controlled by changing the thickness of the insulating film (such as a flattening film) of the array substrate.

(5) In the above-described embodiments, the thickness of the liquid crystal layer is controlled by changing one of the height of the spacers and the thickness of the overcoat film of the CF substrate. However, both the height of the spacers and the thickness of the overcoat film may be changed.

(6) In the above-described embodiments, the side-lit LEDs are used. However, top-emitting LEDs may be used as light sources. Furthermore, a light source other than the LED (such as an organic EL) may be used.

(7) In the above-described embodiments, the backlight device is a one-side lit backlight device in which one of the outer peripheral end surfaces of the light guide plate along one of short sides is a light input end face. However, the backlight device may be a one-side lit backlight device in which one of the outer peripheral end surfaces of the light guide plate along one of long sides is a light input end face. Alternatively, the backlight device may be a two-side lit backlight device in which two of the outer peripheral end surfaces along the long sides or the short sides are light input end faces. Alternatively, the backlight device may be a three-side lit backlight device in which three of the outer peripheral end surfaces of the light guide plate are light input end faces or a four-side lit backlight device in which all the outer peripheral end surfaces of the light guide plate are light input end faces.

(8) In the above-described embodiments, the liquid crystal display device (the liquid crystal panel and the backlight device) has a horizontally long rectangular shape in plan view. However, the shape of the liquid crystal display device in plan view may be a vertically long rectangle, a square, an oval, an ellipse, a circle, a trapezoid, or a shape having a curved portion, for example.

(9) The liquid crystal display device may be adapted to other uses than that in the above-described embodiments.

Explanation of Symbols

10: liquid crystal display device (display device)
11, 111: liquid crystal panel (display panel)
11a, 111a: CF substrate (substrate)
11b, 111b: array substrate (substrate)
11c, 111c: liquid crystal layer
11o, 111o: overcoat film (insulating film)
12: backlight device (lighting device)
15, 115: spacer
16: LED (light source)
18: light guide plate
18a: light input end face
18b: light-exit surface
22, 122: first display section
23, 123: second display section
24: first spacer 25: second spacer
26, 126: LED mounting display portion (light source mounting display portion)
27, 127: LED non-mounting display portion (light source non-mounting display portion)
28: first insulating portion
29: second insulating portion
T1, T2, T3: thickness
T4, T5, T6: film thickness

The invention claimed is:

1. A display device comprising:
light sources arranged at intervals in an arrangement direction;
a light guide plate having a light input end face that is at least a portion of an outer peripheral end surface and through which light from the light sources enters the light guide plate and a light-exit surface that is one of two plate surfaces of the light guide plate and through which the light exits the light guide plate, the light guide plate including a light input end portion including the light input end face and extending in the arrangement direction and the light input end portion including light source opposing portions opposite the light sources, respectively, and light source non-opposing portions opposite the intervals, respectively;
a display panel including two substrates sandwiching a liquid crystal layer therebetween and configured to display an image by using light from the light-exit surface;
a first display section included in the display panel and located relatively away from the light sources and in which the liquid crystal layer has a first thickness; and
a second display section included in the display panel and located relatively near the light sources and disposed to overlap the light input end portion and extending in the arrangement direction, the second display section including light source mounting display portions that overlap the light source opposing portions, respectively, and have a second thickness smaller than the first thickness and light source non-mounting display portions that overlap the light source non-opposing portions, respectively, and have a third thickness greater than the second thickness, the light source mounting display portions and the light source non-mounting display portions being arranged alternately in the arrangement direction.

2. The display device according to claim 1, wherein the third thickness is equal to the first thickness.

3. The display device according to claim 1, wherein the first thickness is set so as to maximize light transmittance of the first display section.

4. The display device according to claim 1, further comprising
spacers located between the substrates and extending through the liquid crystal layer,
the spacers including a first spacer located in the first display section and having a first height and a second spacer located in the light source mounting display portions of the second display section and having a second height that is smaller than the first height.

5. The display device according to claim 1, wherein the display panel includes an insulating film on at least one of the substrates, and
the insulating film includes at least a first insulating portion disposed over the first display section and having a relatively small thickness and a second insulating portion disposed over at least a portion of the second display section and having a relatively large thickness.

6. The display device according to claim 1, wherein the first display section has the first thickness over an entire area of the first display section.

7. The display device according to claim 6, wherein the third thickness is equal to the first thickness.

8. The display device according to claim 6, wherein the first thickness is set so as to maximize light transmittance of the first display section.

9. The display device according to claim 6, further comprising
spacers located between the substrates and extending through the liquid crystal layer,
the spacers including a first spacer located in the first display section and having a first height and a second spacer located in the light source mounting display portions of the second display section and having a second height that is smaller than the first height.

10. The display device according to claim 6, wherein the display panel includes an insulating film on at least one of the substrates, and
the insulating film includes at least a first insulating portion disposed over the first display section and having a relatively small thickness and a second insulating portion disposed over at least a portion of the second display section and having a relatively large thickness.

* * * * *